United States Patent [19]

Adcock

[11] 4,446,853
[45] May 8, 1984

[54] SOLAR COLLECTOR PANEL

[76] Inventor: Thomas P. Adcock, 300 Meadowbrook Dr., Huntsville, Ala. 35803

[21] Appl. No.: 967,044

[22] Filed: Dec. 6, 1978

Related U.S. Application Data

[62] Division of Ser. No. 804,022, Jun. 6, 1977, Pat. No. 4,129,177.

[51] Int. Cl.³ .............................................. F24J 3/02
[52] U.S. Cl. ................................... 126/450; 126/438; 126/440; 126/443
[58] Field of Search ............... 126/442, 443, 450, 426, 126/438, 440

[56] References Cited

U.S. PATENT DOCUMENTS

| | | | |
|---|---|---|---|
| 1,258,405 | 3/1918 | Harrison | 126/438 |
| 3,022,781 | 2/1962 | Andrassy | 126/426 |
| 3,908,631 | 9/1975 | Rom | 126/426 |
| 4,048,981 | 9/1977 | Hobbs | 126/423 X |
| 4,094,301 | 6/1978 | Sorenson et al. | 126/450 X |
| 4,131,111 | 12/1978 | Hopper | 126/450 |
| 4,142,514 | 3/1979 | Newton | 126/450 |
| 4,146,012 | 3/1979 | Elkins et al. | 126/426 X |

Primary Examiner—Samuel Scott
Assistant Examiner—Margaret A. Focarino
Attorney, Agent, or Firm—John H. Raubitschek; Werten F. W. Bellamy; Harold W. Hilton

[57] ABSTRACT

An integrated, completely automatic solar heating and cooling system for buildings is disclosed. The system includes a first and a second interconnectable cooling-/heating subsystem each of which includes a group of solar heat collecting panels, a heat storage reservoir, and a piping network for transferring the heat exchange media, preferably water, therebetween. A third subsystem transfers the media from one or both of the reservoirs to a heat exchanger which transfers heat to or from the building's heating and cooling distribution system. Cooling for the building is accomplished by using a fourth subsystem to chill the media in the first subsystem. In the cooling mode, the solar panels of the first sybsystem are covered and used as a heat exchanger, and the second subsystem, isolated from the first heating subsystem, is used to heat the building's hot water system and to provide building heat if required.

2 Claims, 9 Drawing Figures

SOLAR COLLECTOR PANEL

The invention described herein may be manufactured and used by or for the Government for governmental purposes without payment of any royalty thereon.

This is a division of application Ser. No. 804,022, filed June 6, 1977, now U.S. Pat. No. 4,129,177, issued Dec. 12, 1978.

FIELD OF THE INVENTION

The present invention relates to a solar heating and cooling system for controlling the temperature within a building and for providing hot water for the building. More particularly, the invention relates to the novel arrangement of the components to provide two independent, but interconnectable systems, one being used for heating and one for cooling or both for heating. In a more specific embodiment of the invention, the solar heating and cooling system includes a novel solar collector and storage tank that are particularly well suited for use in the system.

BACKGROUND OF THE INVENTION

Solar heating systems of various types are well known, but as a result of the fossil fuel crisis, such systems have recently attracted greater interest.

Usable solar energy, like usable wind energy and tide energy, is only obtainable intermittently. However, the success of any energy source can be measured by the regularity and reliability with which it can supply the needs of the user. In a building heating and cooling system, this measure of success can be translated into the capability of supplying or removing thermal energy from the living space without the use, or with a minimum use, of auxiliary and back up systems. Regularity and reliability in the intermittent solar energy source is, of course, obtained through the use of a thermal energy storage system. The success of any solar energy system, therefore, is largely dependent upon the energy storage capacity of the system.

Selection of an optimum thermal energy storage system for a building involves considerations of climate, location, insulation, size, material costs, heating and cooling requirements, etc. The most widely used thermal energy storage systems for domestic heating and cooling are water and rocks. Water has the highest heat capacity per weight, volume and dollar value of any conventional, commonly available material. Water can be easily stored and transmitted throughout the system from the solar collectors, to the storage areas and to the heat exchangers. On the other hand, thermal storage in rocks is only about 30% to 40% as efficient per unit volume as thermal storage in water because of the difference in the specific heat or rocks. Consequently, thermal storage in rocks requires a larger storage area. Rock thermal storage systems require a closed-air circulation loop between the solar collectors and the rock bins and an additional closed-loop system between the rock bins and the living space. Studies comparing system cost and thermal storage capacity show that the minimum coverage operating costs in a water system are achieved when about 10 to 15 pounds (or more) of water storage per square foot of collector area is used. In a rock storage system, 1 cubic foot of rock is required per square foot of collector area (about 3 times more volume than water).

Analysis of both water and rock thermal storage systems coupled with other system component costs, efficiencies, space-limiting factors, etc., indicate that water is the simplest and least expensive means for the collection, storage and transfer of solar energy. The chief disadvantage of a water system is the potential damage which could occur if the system should have a leak.

A typical, conventional solar heating system is comprised of a solar collector, one or more heat storage areas which, for water, consist of large tanks and, for air, usually consist of a rock filled enclosure, a heat exchanger which replaces the conventional furnace, and a piping system for distributing a primary coolant between the solar collectors, the heat storage area, and the heat exchanger.

Most of the conventional solar heating systems use a primary coolant of water or air. The components are frequently fabricated from metal and this requires special paints and coatings. To prevent freezing and scale deposits in the water systems, the conventional systems require the use of antifreeze and chemical additives. When a conventional solar heating system is combined with a conventional cooling system, the cost of this system becomes prohibitively expensive and special skills and tools are required for installation because of component complexity, and the interconnecting piping systems. Furthermore, many of the conventional systems cannot be retrofitted into existing structures because of the weight and size requirements of the solar collectors and the storage tanks.

There are many conventional solar heaters or collectors disclosed in the prior art. The following United States patents disclose typical conventional units: Masters U.S. Pat. No. 3,513,828; Hay U.S. Pat. No. 3,563,305; Hay U.S. Pat. No. 3,450,192; Andrassy U.S. Pat. No. 3,022,781; Skiff U.S. Pat. No. 1,074,219; Gough et al U.S. Pat. No. 3,076,450; Schoenfelder U.S. Pat. No. 3,951,128; Danner U.S. Pat. No. 1,473,018; Duncan U.S. Pat. No. 3,089,480; Andrassy U.S. Pat. No. 3,039,453; Abbot U.S. Pat. No. 1,801,710; Severy U.S. Pat. No. 937,013; Stout et al U.S. Pat. No. 3,918,430; and Crawford U.S. Pat. No. 3,859,980.

Briefly considering some of the most relevant of the foregoing patents, the Masters patent discloses a solar water heater utilizing a plastic bag having an upper compartment filled with air and a plurality of lower compartments through which the water flows. The Andrassy U.S. Pat. No. 3,022,781 discloses a solar water heater having a water compartment comprised of a flexible plastic top and bottom with a plurality of fluid conduits interconnecting an upper and lower header, the plastic top being transparent and the plastic bottom being black, and a wooden frame for supporting the water compartment. The Stout et al patent discloses a solar heating panel having a rectangular frame made from rigid, foam plastic material, an upper plastic cover, a water compartment comprised of a reflective bottom and a flexible top joined together so as to form a plurality of spaced apart, parallel water channels. The Skiff patent discloses a solar heater having a channel shaped upper glass lens forming a top cover of the heater for focusing the solar rays. The aforementioned Hay patents also disclose a solar heating system utilizing a plurality of flexible water storage containers located in the ceiling, floors and walls of a structure.

In general, conventional solar heating and cooling systems, and their associated conventional components, fail to provide an integrated, relatively inexpensive, easy to assemble, efficient system which can be constructed from inexpensive and lightweight components.

SUMMARY OF THE INVENTION

In accordance with the present invention, a total solar energy heating and cooling system is provided which overcomes the foregoing and other disadvantages and shortcomings of the prior art. The solar energy heating and cooling system of the invention utilizes conventional materials and constitutes a simple, inexpensive, heighly efficient system that can furnish up to 80% or more of the total energy requirements for heating, cooling, and domestic hot water for an average residential or commercial building. The component parts can be mass produced in a kit form for easy assembly and installation on site by an average handyman in either new structures or in presently existing structures without the need for special skills or tools.

The present system utilizes a closed loop flow of a primary heat exchange media, (water being used in a preferred embodiment) thereby preventing the entry of contaminants into the media. The total system is maintained at low pressure throughout and employs a minimum number of heat exchangers. A large media storage capacity can be obtained by utilizing unused areas such as under floors and under raised sundecks. Duplication of unnecessary components is eliminated on the one hand, while on the other hand, isolation of components, for example for repair, is possible, without interferring with the operation of remaining portions of the system. Complete automation of the system is possible and most of the operation of the system can be controlled from a single control panel. Further, troubleshooting and repairing of the system is easy. The system is expandable, and can be installed in stages with attendant reduction of initial cost.

As stated in certain preferred embodiments of the present invention, water is used as a primary heat exchange media and the storage tanks and solar collectors are principally comprised of flexible, thermoplastic sheets. Weight reduction, corrosion prevention and scale prevention can be obtained by using conventional plastic plumbing. The expansion problems caused by hot water are eliminated through the use of expandable storage tanks and solar collectors. In a preferred embodiment of the invention, a group of solar collectors is also used as heat exchangers for coolings the circulating media, thereby eliminating the need for an additional heat exchanger.

A solar collector panel according to a preferred embodiment of the present invention is constructed entirely out of thermoplastic materials and requires no special heat absorbing paints or coatings. Presently available manufacturing techniques can be utilized for mass production of the panels from low cost materials resulting in a very inexpensive component. Theremoplastic materials have a long life and the present design permits easy repair or replacement of any individual component parts. The collector panel is resistant to scale buildup, freezing of the media (without the addition of antifreeze for water) and damage from sunlight, heat, hail and wind, and other impacting forces. The solar panel has a self-draining feature and can be mounted either flat, sloping in a vertical direction, or sloping in a horizontal direction. Because of its design and the use of thermoplastic materials, the present solar collector panel is very light weight, yet is rigid enough to withstand substantial punishment.

According to a preferred embodiment of the present invention, the solar heating and cooling system includes a primary low pressure piping system for containing and pumping a primary media. The piping system includes a first and second piping network and a first and second pump therefor, and valve means for selectively interconnecting the first and second piping networks. The system further comprises a primary heat exchanger in a heat exchange relationship with the building air distribution system and the primary media transmitted respectively through the first and second piping networks. First and second low pressure media storage reservoirs are connected to the first and second piping networks, respectively. Similarly, first and second solar heat collector means are thermally coupled, in heat exchange relationship, to the first and second piping networks, respectively. Cooling of the primary media in the first piping and storage system is achieved through a cooling subsystem that chills a secondary media. The cooling subsystem in a preferred embodiment includes a rotary vane compressor unit for cooling the secondary coolant media (air), a high pressure piping system connected to the compressor unit, a heat exchanger connected to the high pressure piping network and a low pressure piping section connected to the compressor low pressure output. The cooling subsystem also includes a means for causing the secondary low pressure coolant media to flow through the low pressure piping system from the cooling unit to, and through, the solar collectors used as the heat exchanger.

Other features and advantages of the present invention will be discussed in, or apparent from, the description of the preferred embodiment of the invention found hereinbelow.

DESCRIPTION OF THE PREFERRED EMBODIMENT

With reference to the figures, wherein like numerals indicate like elements throughout the several views, a heating and cooling system, and its components parts, are illustrated in detail. As noted previously, the presently preferred embodiment of the invention uses water as the primary media to transfer heat between the various components of the system.

Figure 1:
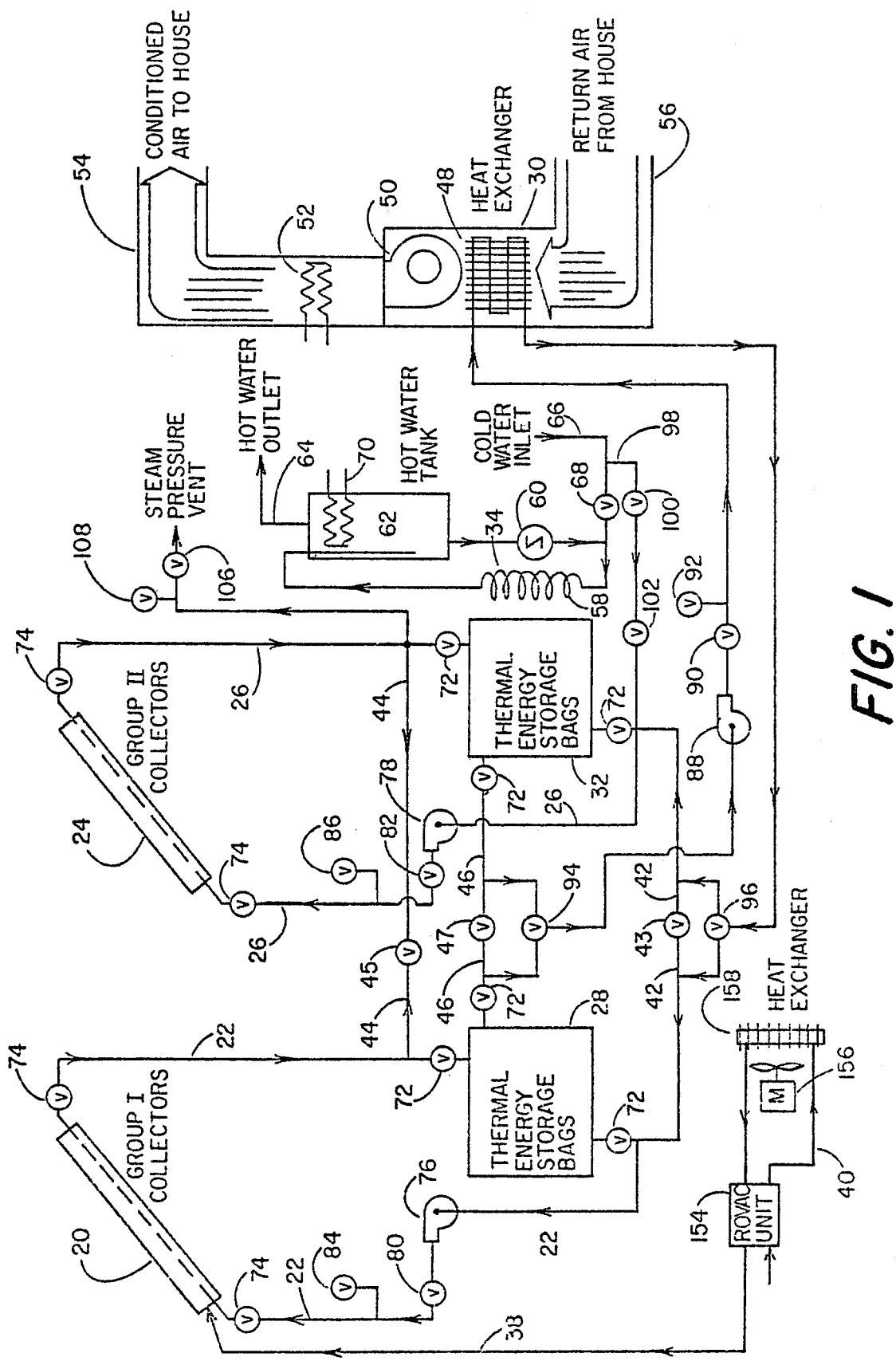
FIG. 1 is a schematic drawing of a heating and cooling system in accordance with the present invention.

With reference to FIG. 1, the solar heating and cooling system in the present invention comprises a first group of solar collectors 20 connected to a first piping network 22 and a second group of solar collectors 24 connected to a second piping network 26. First piping network 22 interconnects the first group of solar collectors 20 with a first thermal energy storage reservoir 28. Similarly, second piping network 26 interconnects the second group of solar collectors 24 with a second thermal energy storage energy reservoir 32. A cooling subsystem 40 provides chilling of the water media and includes, in the preferred embodiment, a secondary piping system 38 for transporting air as a secondary coolant between a cooling unit 40 and the first group of solar collectors 20 which can be used as a heat exchanger. Three interconnecting pipes, 42, 44, and 46, together with corresponding, manually or electrically operated valves, 43, 45, 47, permit the interconnection or isolation of first piping network 22 and second piping network 26 between the solar collector supply, the solar collector discharge, and the thermal energy storage tanks 28 and 32, respectively.

The first piping network 22 together with first group of solar collectors 20, first reservoir 28, and first heat exchanger 30, provide the principal means for heating and cooling the building air conditioning system in which the present invention is installed. As used in this application, air conditioning means maintain the building space at the desired temperature. Thus, the present invention provides heat for the building's air handling system during cold weather and provides cooling for the building's air handling system in hot weather. Heat exchanger 30 is located in the building's air handling system which is disclosed as a forced central-air handling and distribution system. Heat exchanger 30 comprises a finned coil of piping 48 located on the suction side of the building's main air conditioning fan 50. Electrical auxiliary heaters 52 can be located in the discharge of air conditioning fan 50 to supplement, if necessary, the heat added to the air conditioning system by the solar heating and cooling system or the present invention. The building air conditioning system also includes air supply ducting 54 and air conditioning return ducting 56.

The secondary piping network 26 together with second group of solar collectors 24, second reservoir 32, and second heat exchanger 34 are principally used to provide the building's hot water and, when interconnected to the first piping network in a special mode described hereinbelow, provide space heating for the building when the first piping network is lined up in the cooling mode of operation. Heat exchanger 34 comprises, essentially, copper piping 58 configured in a serpentine pattern and mounted against the side of second reservoir 32. The low side of piping 58 is connected to the bottom end connection of the hot water tank through a check valve 60. The other end of copper piping 58 is connected to the normal cold water inlet of a standard hot water tank 62. Water will flow as a result of a thermal driving head from the bottom of hot water tank 62 where the water is the coldest and densest, to the low side of copper piping 58. Water will then flow upwardly through the copper piping, pick up heat from reservoir 32 and becomes less dense, and, finally, flow into the top of hot water tank 62. Hot water is drawn off the top of hot water tank 62 through an outlet 64 to supply the building's hot water needs. Make-up water from the building's cold water supply is provided through an inlet pipe 66 and a normally open, manually operated isolation valve 68 to the discharge side of check valve 60, which prevents the direct addition of cold water into hot water tank 62. The building's cold water pressure provides sufficient pressure in the building's hot water system. During periods of non-use, the temperature is maintained in the hot water tank by the aforedescribed circulation through second heat exchanger 34. Electric auxiliary heaters 70 can be installed in the top of hot water tank 62 to add, if necessary, additional heat which will maintain the hot water at the desired temperature. An auxiliary pump can be located between the outlet of hot water tank 62 and check valve 60, but should not be needed because of the thermal driving head and siphon effect in the hot water system.

Both first piping network 22 and second piping network 26 are designed to use commercially available, high temperature plastic piping and valves (CPVC) which are easily installed without the need for special tools. Numberous manually operated cut-off valves are strategically located throughout the system to provide isolation of various parts. Each of the water storage bags making up the storage reservoirs have isolation valves 72 and, similarly, each of the solar panels making up the solar collectors 20 and 24 have individual inlet and outlet isolation valves 74. In addition, both first and second piping networks 22 and 26 have a corresponding electrically driven, centrifugal hot water pump, 76 and 78 respectively, for circulating the water media through the respective group of solar collectors at low-flow rates of from 1 to 5 gallons per minute per collector panel, the flow being adjusted by throttle valves 80 and 82 respectively and the pressure being measured by pressure gauges 84 and 86 respectively located downstream of throttle valves 80 and 82. The suction and discharge of a third pump 88 can be selectively controlled to be on either the first reservoir side, or the second reservoir side, of interconnecting valves 43 and 47, respectively, by solenoid-operated, suction and discharge, three-way valves 94 and 96. Naturally, if interconnecting valves 43 and 47 are open, pump 88 will take suction from, and dischage to, both storage reservoirs 28 and 32.

Make-up water for reservoirs 28 and 32 is obtained from a water make-up line 98 from the cold water inlet pipe 66 at a location upstream of isolation valve 68. Make-up line 98 has a manually operated isolation valve 100 and a solenoid-operated isolation valve 102 which permits automatic supply of make-up water to the second piping networks 26 and to the first piping network 22 when valve 43 is open. Make-up water is first sent through the solar collectors before being added to the reservoirs to limit unnecessary temperature variations of the stored water media. Should the pressure in the operating solar collectors approach dangerous levels, for example by the water overheating in the solar collectors, a low pressure relief valve 106 will automatically be opened, thereby preventing damage to the solar collectors or to the reservoirs. Relief valve 106 is connected to the second solar collector outlet side of interconnecting valve 45 because, as explained below, second solar collectors 24 are always lined up to produce heat. Pressure relief of all solar collectors and reservoirs is accomplished during winter months since valve 45 is open and all collectors are lined up to produce heat. A pressure gauge 108 can be used to monitor the pressure just upstream of relief valve 106.

Figure 2:
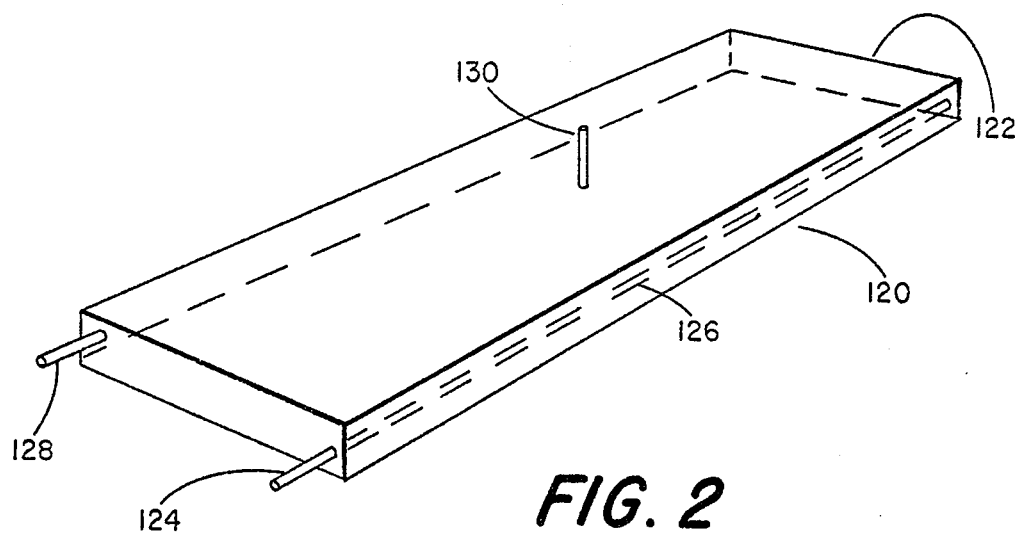
FIG. 2 is a perspective view of a water storage bag usable as a thermal energy reservoir in the disclosed heating and cooling system.

The thermal energy storage reservoirs 28 and 32 are each comprised of a plurality of individual water storage bags 120 as shown in FIG. 2. Each storage bag 120 is comprised of flexible, high temperature thermoplastic sheets 122, each sheet preferably having a minimum thickness of 15 mils. The seams of sheets 122 can be either heat bonded or welded together using conventional heat welding techniques or can be bonded together with a solvent. In any event, storage bag 120 when filled with water must be able to withstand static water pressure and residual steam pressure at an operating temperature of 180° F. during normal use and up to 212° F. for intermittent short periods. Since storage bags 120 are completely flexible without a rigid frame, they can be installed in existing installations without the removal of structural walls and floors. Storage bags 120 are normally sized so that when filled and expanded with water the bag will conveniently fit within the building framing spaces. The flexibility of storage bags 120 also eliminates problems encountered from the expansion of the water as it is heated. A flexible plastic pipe 124 is permanently attached at one end of storage bag 120 by heat bonding or solvent bonding and is connected to an internal extension 126 which extends to the opposite end of storage bag 120. Pipe 124 preferably has a three quarter inch minimum inner diameter and extends at least one foot out of storage bag 120. Extension tube 126 is preferably a one half inch diameter CPVC pipe that has been inserted through inlet pipe 124 during the installation of storage bag 120. A flexible plastic pipe 128, which is similar to pipe 124, is located at the same end as pipe 124 but terminates close to the upper end of storage bag 120, thereby preventing short circuiting of the water flow path between the inlet and outlet pipes. Both inlet and outlet pipes 124 and 138 are preferably located at least two inches from either the top or bottom of storage bag 120 and six inches from the respective edges thereof. Located at approximately the center of the top of storage bag 120 and extending outwardly approximately one foot therefrom is a flexible plastic pipe 130. Pipe 130 provides for the return of water from the collector panels and pressure venting. Connections to the system plumbing from pipe 124, pipe 128 and pipe 130 can be made using simple plastic or metal hose clamps.

By combining a number of water storage bags 120, the necessary volume of water storage can be obtained, the volume of water storage being calculated in a conventional manner as mentioned above. In one particular system, first thermal energy storage reservoir 28 was comprised of six water storage bags 120 and the second thermal energy storage reservoir 32 was comprised of two water storage bags 120. In a typical situation, individual water storage bags 120 can be designed to fit specific space requirements or fabricated in standard production sizes. Normally, the water storage bags 120 comprising a particular reservoir will be connected through three manifolds, a solar collector supply manifold, a solar collector return manifold, and a heat exchanger feed supply and return manifold. Naturally, should the actual location of any individual water storage bag 120 be at a distance from the manifolds, further isolation valves at the location of the storage bag 120 can be used.

Figure 3:
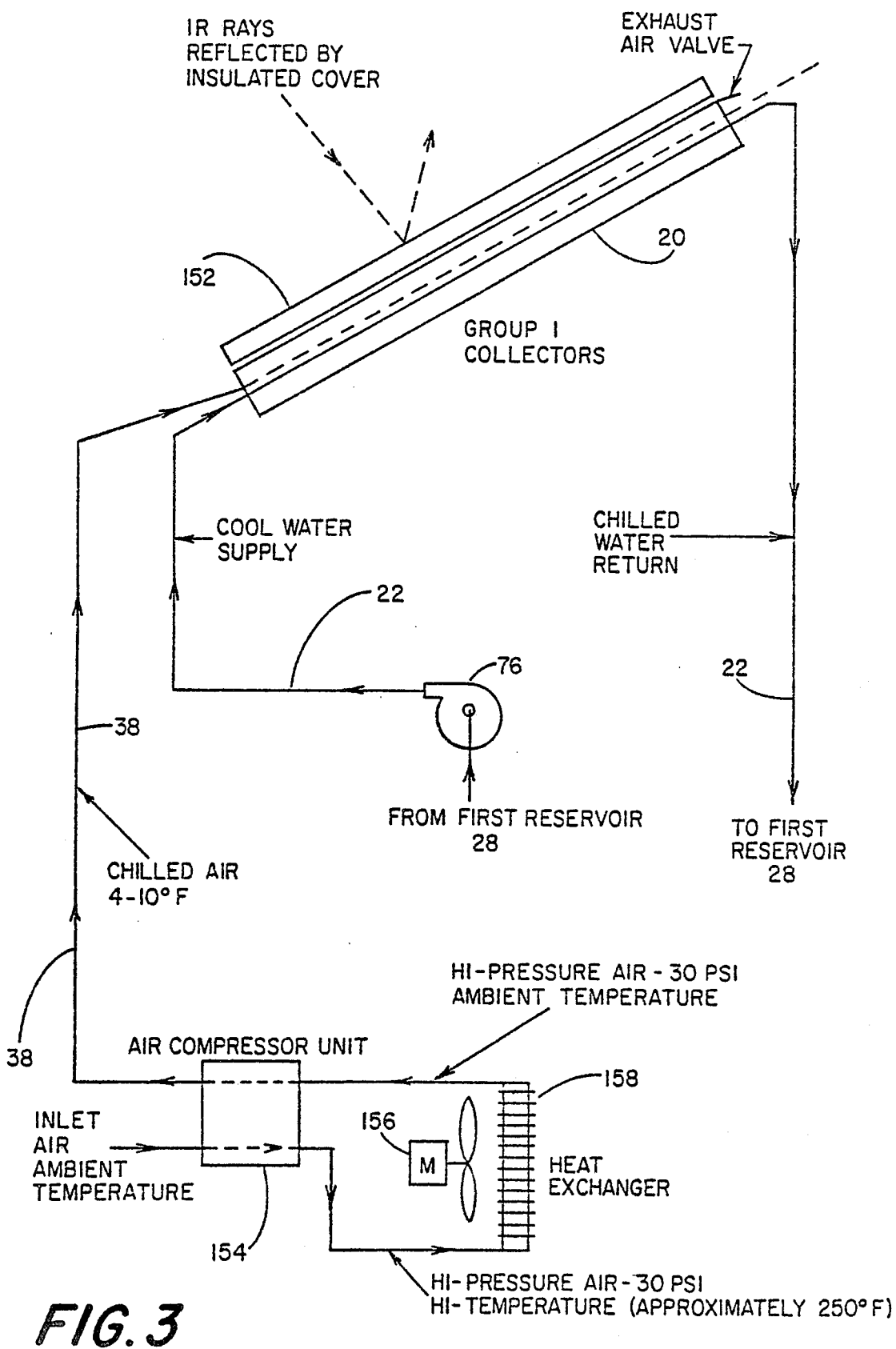
FIG. 3 is an enlarged schematic flow diagram showing the use of a solar collector as a cooling heat exchanger to produce chilled water.

With reference to FIG. 3, secondary cooling subsystem 40 is shown in greater detail. Cooling subsystem 40 comprises a cooling unit for chilling a secondary media that is to be used to cool the primary media from reservoir 28 in a further heat exchanger. In the preferred embodiment, the first group of solar collectors 20 is used as the secondary heat exchanger during summer months and when so used, the sun is blocked out with a reflective insulated cover 152, installed over each of the individual collector panels. In a presently preferred embodiment of the invention, cooling subsystems 40 chills and circulates chilled air between he inflatable top cover 204 and the individual solar absorbers 206 of solar collector 20, while water is pumped through the solar absorber 206 by pump 76.

In the presently preferred embodiment of the invention, cooling unit 40 is comprised of a rotary vaned air compressor 154, a cooling fan 156, and a conventional heat exchanger 158. Air compressor 154 can be the newly developed "ROVAC" Unit reported in the August 1973 *Popular Science Magazine* at page 60 and in the December 1970 *Popular Science Magazine*. The word "ROVAC" is an acronym which stands for Rotary Vane Air Cycle. The ROVAC compressor is basically a vaned hub rotating within an eliptical housing. Air, taken in at ambient temperature and pressure, is compressed to about 30 psia, thereby being heated to approximately 250° F., and is discharged to a heat exchanger which can be a basic "Modine" finned tube heat exchanger with a blower fan. The compressed air is cooled to near ambient temperature in the heat exchanger and is returned to the opposite side of the compressor where it is expanded, thereby returning a large portion of the energy of compression to the compressor and resulting in cooling the air to 4° F. to 10° F. The result is a combination of air and ice crystals exiting from the output port of the compressor.

The chilled air exits from air compressor 154 with sufficient pressure to flow through secondary piping systems 38 to the first group of collectors 20. The chilled air flows across the clear top 250 of the absorber as the primary heat exchange media flows through channels 258 of the absorber thereby chilling the water. The air then exits through slotted vent holes in the collector frame at the opposite end of the individual solar panels.

Figure 4:
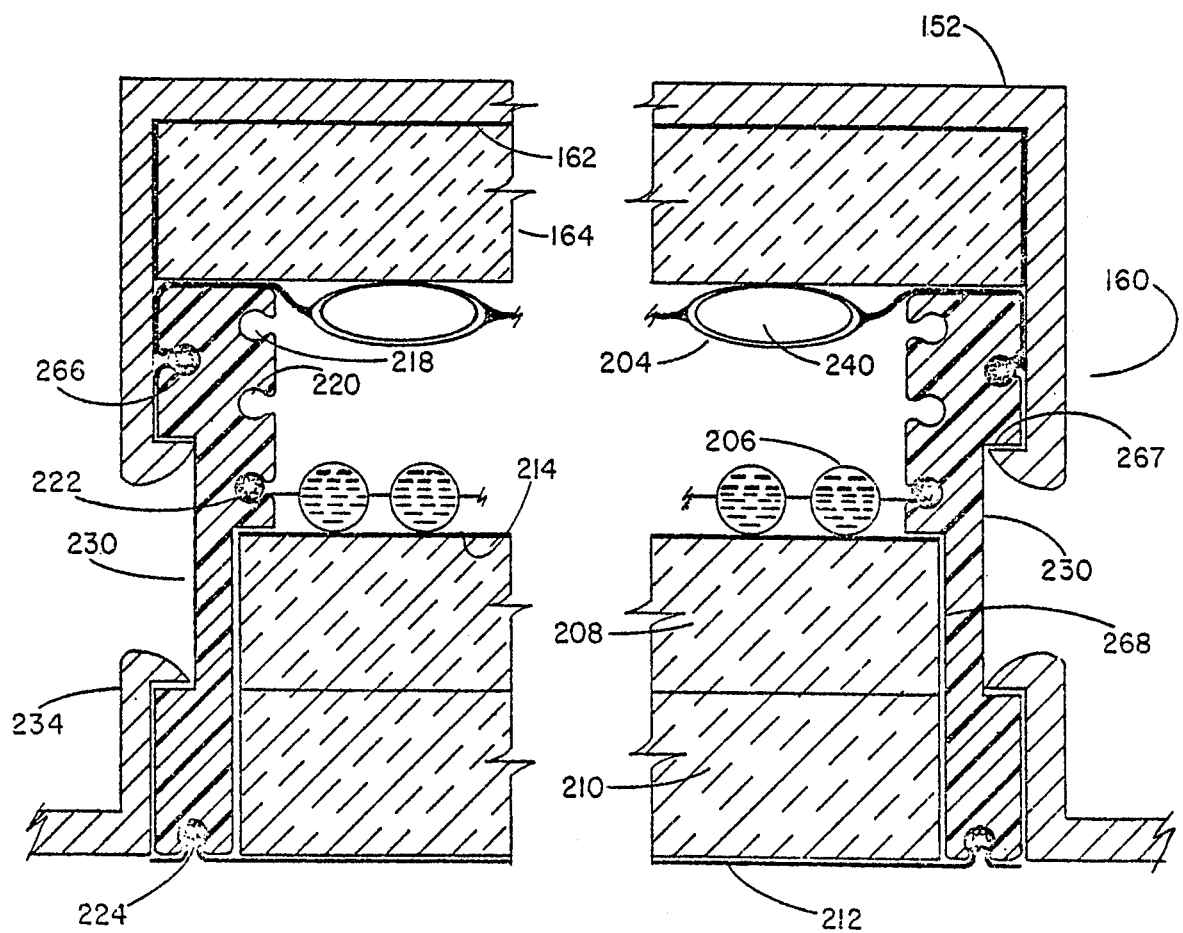
FIG. 4 is a transverse cross-sectional view of a solar collector and reflective insulating cover used in the cooling mode in accordance with the present invention.

A solar panel 20 in accordance with the present invention is depicted in FIGS. 4 through 8, and is shown in FIG. 4 with cover 152 in place. Cover 152 comprises a group of flexible, rigid plastic lock-down brackets 160 that can extend the entire width of solar panel 20, a sheet of thick aluminum film 162, and a block of rigid foam insulation 164 that is preferably at least one inch thick.

Solar panel 20 comprises a frame 230 preferably molded from a rigid, thermo-plastic foam, an inflatable, channeled top 204 mounted to the frame 230, a multi-channeled absorber cell 206 mounted to frame 230 spaced below top 204, upper and lower rigid insulation blocks 208 and 210 mounted inside frame 230 below absorber cell 206, and a plastic film bottom cover 212 mounted to the bottom of frame 230 for preventing entry of moisture into the interior of the assembled collector. A thick sheet of aluminum foil 214 covers the upper surface of upper insulation block 208 to reflect heat back into the water absorber.

Figure 5:
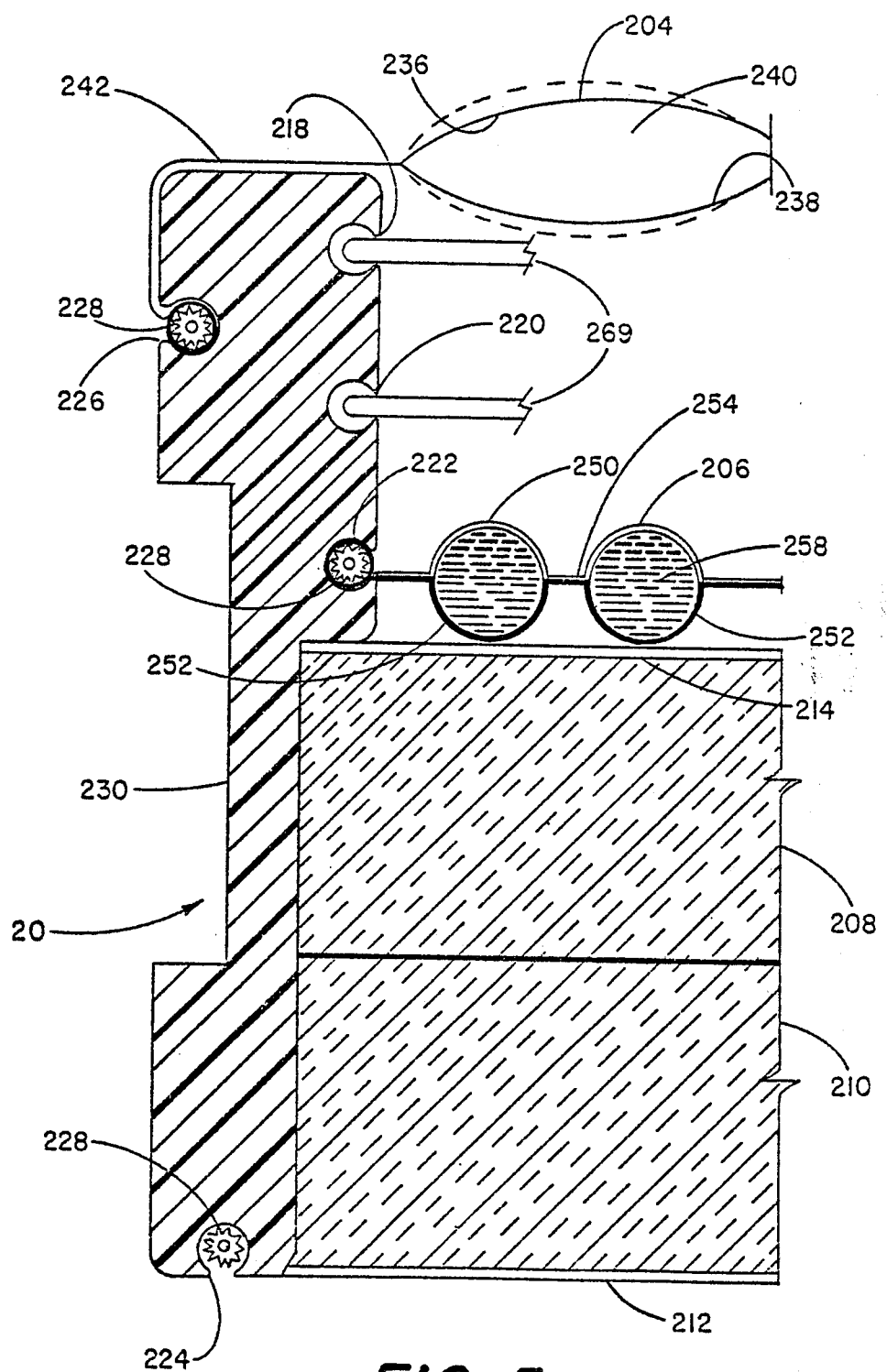
FIG. 5 is a plan view of the solar collector shown in FIG. 4, with the reflective insulating cover removed.
Figure 8:
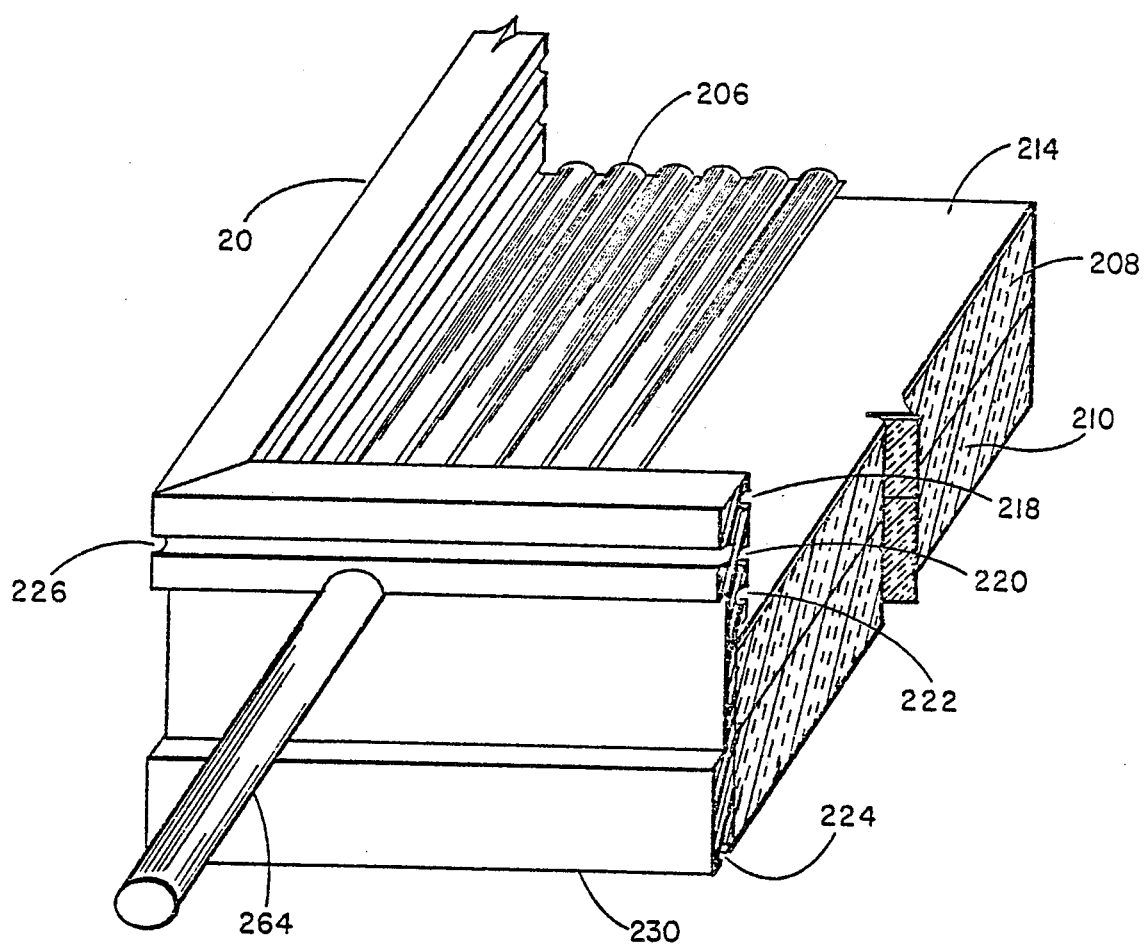
FIG. 8 is a perspective view, with parts removed, of a corner of the solar collector.

With particular reference to FIGS. 4, 5 and 8, frame 230 is preferably injection or extrusion molded into standard lengths which can then be cut with 45° corners into the desired length and fastened together with corner brackets (not shown) to form a hollow rectangular frame. Each frame 230 has a plurality of five longitudinal grooves 218, 220, 222, 224, and 226 extending along the length thereof. Each groove is substantially similar and has a circular cross section, as best seen in FIG. 5. Grooves 218, 220, and 222 are located in the upper portion on the inside surface of frame 230. Grooves 222, 224, and 226 are respectively used to mount the edges of absorber cell 206, bottom cover 212, and top 204 with conventional serrated or splined tubular plastic lock-in strips 228. Typical diameters of lock-in strips 228 are from ⅛ inch to 3/16 inch. Grooves 218 and 220 can be used to mount rigid plastic or glass covers in lieu of cover 206.

The periphery of collector panel frame 230 is shaped to provide a large outer, centrally located notch or cutout portion and a large inner, lower notch or cutout protion, both notches extending the entire length and width of panel 230. Notches 267 provide an upper surface to permit attachment of panel cover lock down strips 160 (as shown in FIG. 4) and a lower surface to permit engagement of a roof mounting, hold-down bracket 234 (also shown in FIG. 4). Inner notch 268 is used to hold insulation blocks 208 and 210 in place.

A particular preferred embodiment of frame 230 utilizes a structural, theremo-plastic polyester foam such as "CELANEX" 3300 or 3310 encased by a solid skin having a typical thickness of 0.03 to 0.08 inches. A typical frame panel has a height of 3½ inches and overall width of ¾ inch. Such a panel has a high tensile strength, a weather resistance of from 10 to 20 years, an ultraviolet resistance of from 10 to 20 years, a useful temperature range for continuous use of from $-40°$ F. to $+285°$ F. (with short-term temperature excursions from $-65°$ F. up to $420°$ F.) a low moisture absorption, and excellent dimensional stability, abrasion resistance, and solvent resistance. Although the frame can have any particular color, for outdoor continuous exposure it is advantageous is frame 230 is colored black.

Figure 7:
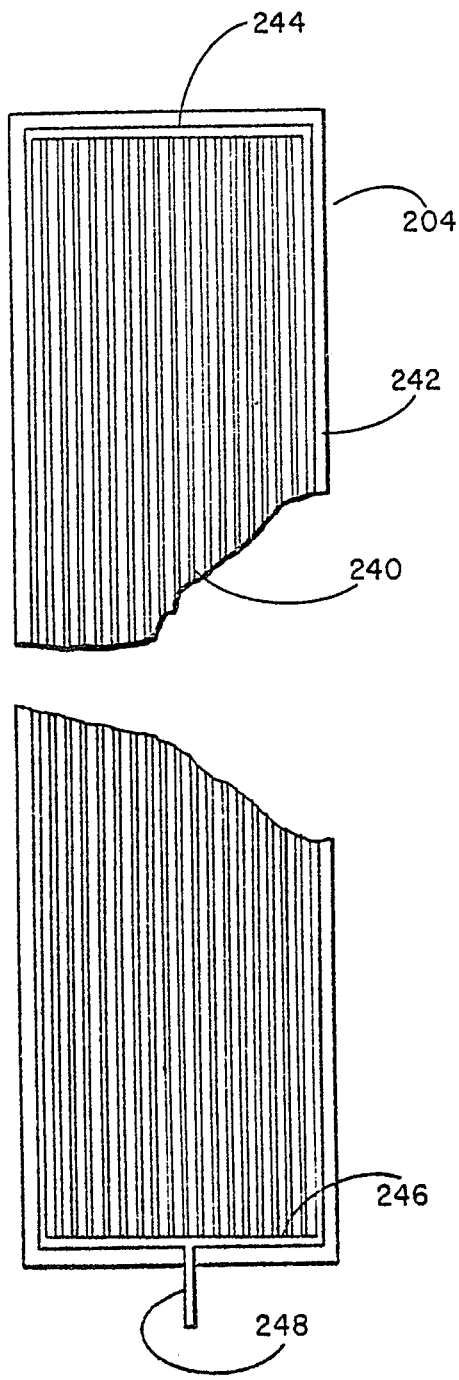
FIG. 7 is a top view of the solar collector inflatable cover shown in FIGS. 4 and 5 and particularly showing the air channels and manifolds.
Figure 6:
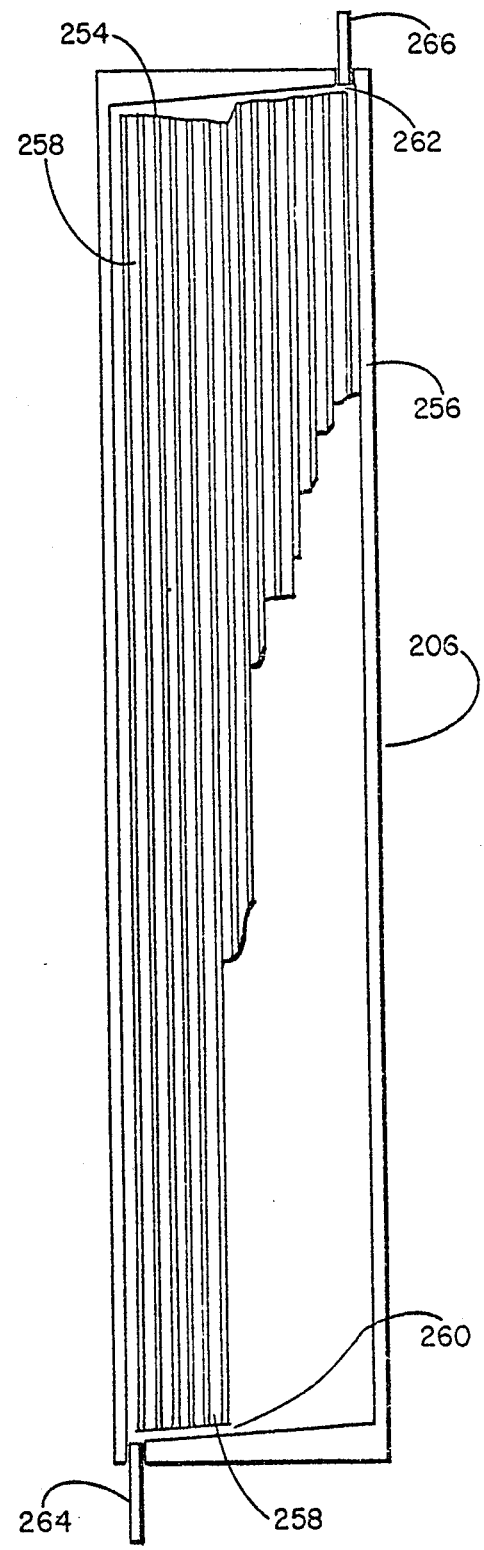
FIG. 6 is a top view of the solar collector absorber cell shown in FIGS. 4, 5 and 8 and particularly showing the heat exchange media channels and manifolds.

The top cover 204 of solar panel 20 is shown in FIGS. 4, 5, and 7 and is comprised of upper and lower clear plastic sheets indicated at 236 and 238 of FIG. 5, which are heat-welded together so as to form a plurality of spaced apart, parallel, hollow channels 240 in the interior portion thereof and a wide circumferential border 242 for mounting to frame 230 to provide an airtight seal. The seams between channels 240 preferably do not extend completely to border 242 so that upper and lower manifolds 244 and 246 are provided. A hollow plastic tube 248, FIG. 7, is heat welded between upper and lower sheets 236 and 238 in fluid communication with lower manifold 246 and provides a means for inflating top 204. The air channels 240 should preferably have a minimum width of one inch and be separated by an eighth of an inch seam. As mentioned above, top 204 is mounted to frame 230 in groove 226 along the edges thereof at border 242.

After top 204 is installed on assembled collector frame 230 and is substantially inflated, channels 240 expand and crate a tension between top 204 and frame 230, thereby providing rigidity and strength for solar panel 20. When inflated, channels 240 have the affect of a double cover and the rounded surfaces not only reduce the incident angle between solar panel 20 and the sun from sunrise to sunset, but also focus the suns rays as a result of the lens shape, which thus further increases the overall efficiency of panel 20. In addition, the air inside channels 240 acts as an insulation barrier and permits a build up of great temperatures inside solar panel 20.

In the cooling mode the inflatable top cover 204 can be replaced by a rigid plastic, reflective, insulating cover to block out the sun when the solar collector 20 is used as a heat exchanger during the summer months.

Absorber cell 206, similar to top 204, is comprised of a top sheet 250 and a bottom sheet 252 that are heat welded together along the peripheries thereof and along a plurality of parallel means 254, thereby resulting in a fluid tight border 256 and a plurality of parrallel fluid channels 258. Seams 254 terminate at a point spaced from border 256 at each end of absorber cell 206, thereby resulting in an inlet manifold 260 and an outlet manifold 262. Top sheet 250 is clear thermoplastic material preferably comprised of a polyether base polyurethane elastomer and has a preferred thickness of at least six mils. Bottom sheet 252 is similar to top sheet 250, except that it is colored black. Borders 256 at each end of absorber cell 206 are tapered toward opposite sides thereby providing a tapered manifold for automatic drainage of water cell 206 when the water pumps are not operating. A flexible, thermoplastic hollow inlet tube 264 and a flexible thermoplastic hollow outlet tube 266 are mounted in a water tight seal between top and bottom sheets 250 and 252 at the tapered ends of border 256 in fluid communication with inlet and outlet manifolds 260 and 262, respectively.

When the suns rays strike absorber cell 206, the clear top sheet 250 permits the rays, which are infrared, to penetrate through the media contained therein and strike the black surface of bottom sheet 252 where maximum heat absorption takes place. Reflected radiation from bottom sheet 252, in the form of long wave radiation, passes back through the media and is trapped by top sheet 250 which maximizes collection of the sun's heat energy. In addition, the cylindrical top and bottom part of channels 258 has a focusing effect on the infrared and reflected radiation which further increases the overall efficiency of absorber cell 206.

As mentioned above, located beneath absorber cell 206 are insulation blocks 208 and 210 covered by aluminum foil 214. Insulation blocks 208 and 210 are preferably comprised of one inch thick rigid foam insulation material and one inch thick firm fiberglass material which meet local fire rating regulations. Aluminum foil 214 can be either rested on top of upper insulation block 208 or bonded thereto, and further increases the efficiency of solar panel 20 by reflecting rear side heat loses back to absorber cell 206. The rigid insulation blocks not only provide adequate insulation for solar panel 20, but further increase the rigidity of frame 230.

Because of the unique design, solar panel 20 can be manufactured and shipped in individual components and easily assembled by the installer. After the individual frame panels 230 are cut to the desired length, they are bonded together with conventional solvent glue to form the frame assembly. Corner braces can then be installed if desired. After upper and lower insulation blocks 208 and 210 are cut to size and installed inside the frame assembly, absorber cell 206 is installed by wrapping border 256 around a lock-in strip 228 and inserting the combination into channel 222. Top 204 is installed by similarly wrapping border 242 around a lock in strip 228 and inserting the combination into channel 226.

Once collector panel 20 is set up, its operation is completely automatic. The sun heats up the media flowing through absorber cell 206 as follower. Short wavelength radiation (0.3 to 3 micron wavelength) passes through both clear plastic layers of top 204, which tend to focus the light onto absorber cell 206. Short-wave radiation then passes through the clear plastic layer of top sheet 250 of absorber cell 206 and is partially absorbed (as heat) by the media during the initial travel of the radiation through the media to the black bottom sheet 252 of absorber cell 206. The black surface collects the heat of the short waves and retransmits heat energy as long waves back through the media where more of the heat is absorbed. These long waves strike the clear top sheet 250 and are reflected back through the media to the black bottom sheet 252. This reflecting action continues (commonly referred to as the greenhouse effect, which in this case, is created by multiple passes of the short and long waves within the transfer media) until the maximum heat is absorbed by the media. As can be seen from the above, the maximum amount of heat is thereby transferred to the media during its travel from the inlet tube 264 to the outlet tube 266, which increases overall collector efficiency.

The heat energy absorbed by the black bottom sheet 252 from the short waves is also transferred to the heat exchange media by conduction. Radiant heat emitted from the backside of bottom sheet 252 is deterred from entering the insulation material by aluminum foil 214. Since aluminum has a low absorption and a high reflectance at all wavelengths, most of this heat energy is reflected back to the absorber. Thus, aluminum foil 214 helps to increase overall collector efficiency.

Insulation blocks 208 and 210 further reduce heat losses from the back of the solar panel. Edge losses are minimized by the foam core construction of frame 230 and the plastic-to-plastic construction design techniques used throughout the solar panel 20.

Outgassing exhibited by insulation (due to elevated temperatures) is virtually eliminated from entering the area between top 204 and the absorber cell 206 by the aforedescribed mounting methods used between frame 230 and absorber cell 206.

Figure 9:
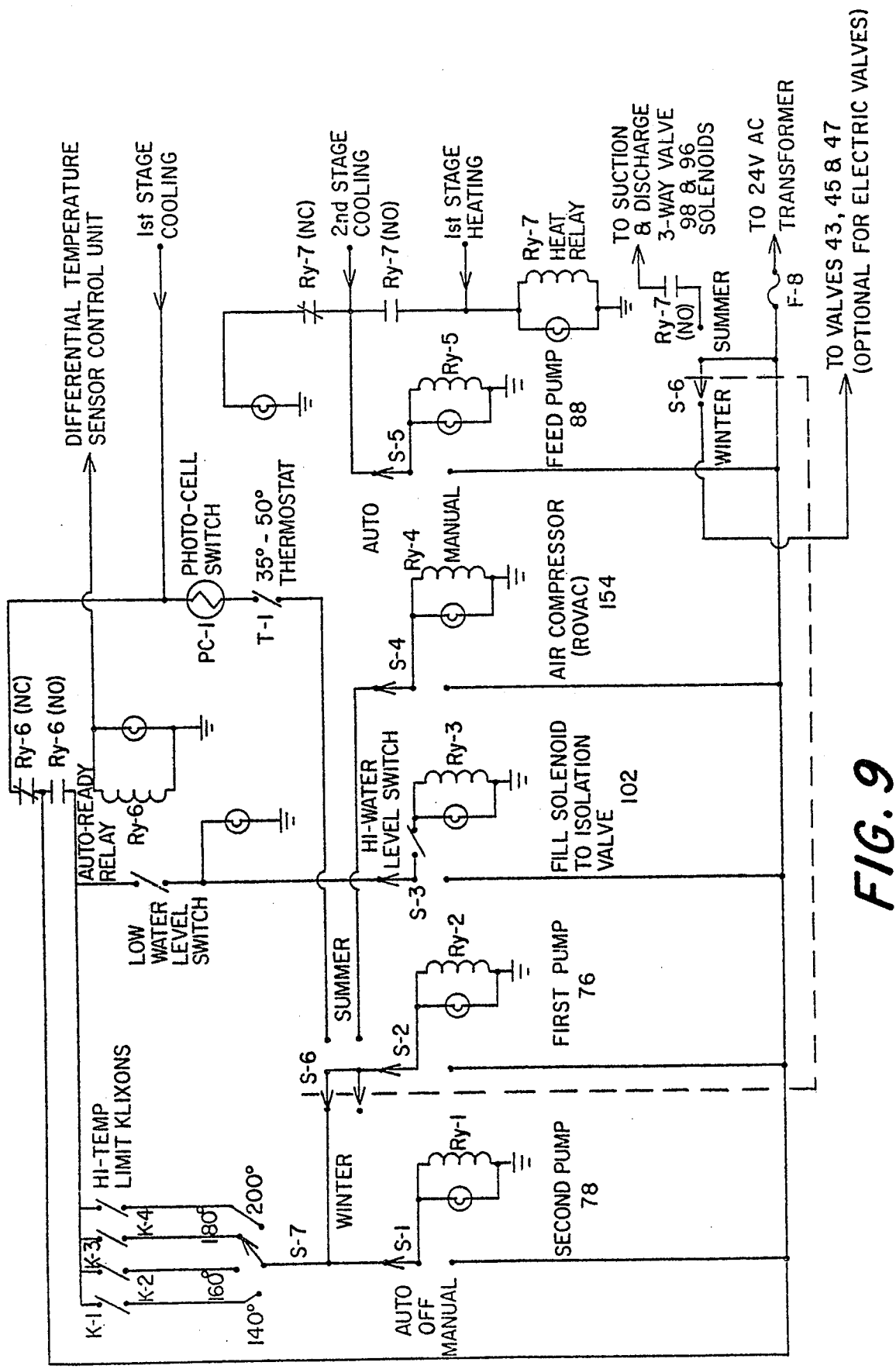
FIG. 9 is an electrical schematic diagram of the control circuitry for the heating and cooling system.

FIG. 9 is illustrated in the electrical control circuits for the system described hereinabove. A photo cell switch PC-1 is mounted in group 1 collectors 20 to ensure that pump 76 will not be operated in the cooling mode during daylight hours if the cover 152 is not installed. When switch S-1 is placed AUTO position, operation of second pump 78 is possible only when auto-ready relay RY-6 is energized and the stored water temperature is below the selected setting by switch S-7. Alternatively, manual operation of second pump 78 can be accomplished by placing switch S-1 in the manual position to operate the pump or in the OFF position to manually turn off the pump. Control of first pump 76 is identical to that of second pump 78 when SUMMER/WINTER SELECTOR switch S-6 is in the WINTER position. When switch S-6 is in the SUMMER position, the operation of pump 76 when selector switch S-2 is in the AUTO position is determined by the satisfaction of the following conditions. A thermostat T-1 determines that there is a requirement for water chilling, photo cell PC-1 indicates that it is either night or that cover 152 is in place, and the building theremostat calls for cooling of the auto-ready relay RY-6 is de-energized. When media chilling is required, pump 76 is energized and compressor 154 is energized if switch S-4 is in the AUTO position. The cooling operation will continue until thermostat T-1 is satisfied.

Improper conditions can also be indicated on a control panel such as a low water media level which will energize solenoid operated isolation valve 102 to supply makeup water until the high water level limit switch is opened. Feed pump 88 provides either hot or chilled water to the first heat exchanger 30 based on demand by the building thermostat when switch S-5 is in the AUTO position. Fuses can be provided to protect the control circuits.

Switch S-6 selects the mode of operation and is preferably a three-pole, double-throw switch. During the SUMMER mode of opeation, pumps 76 and 78 are electrically isolated from one another. This switch also applies power to normally open (NO) set of contacts on heat relay. The other side of the contacts of relay Ry-7 is connected to the solenoids of suction and discharge three way valves 94 and 96. Thus, hot water can be drawn from second reservoir 32 during cold nights when heat is required, while switch S-6 is in the SUMMER position.

The AUTO-READY relay Ry-6 is controlled by an external differential temperature sensor control unit which monitors the temperature difference between the solar collectors and the hot water stored in the reservoirs. When the temperature of the water in the collectors rises above the temperature of the water stored in the reservoirs by a predetermined amount (normally from 10° to 15° F.), relay Ry-6 is energized and applies power through the selected (by switch S-7) high temperature limit switch to switch S-6. This permits pump 78 to be energized, provided switch S-1 is in the AUTO position. Pump 76 will also be energized if switch S-2 is in the AUTO position and switch S-6 is in the WINTER mode. When the collector temperature drops to within a predetermined differential temperature (approximately 5° F.) of the temperature of the water in the thermal energy storage reservoirs, relay Ry-6 is deenergized and the pumps are deenergized.

Although the present invention has been described hereinabove in a presently preferred embodiment, modifications within the scope and spirit of the invention will be evident to one of ordinary skill in the art. Thus, for example, although absorber cell 206 has been depicted as having two headers and a plurality of parallel channels, it is apparent that a single serpentine channel can be used, if a smaller volume of hotter media is desired. It is also apparent that water or air can be used as the primary media or that water and a conventional chill water system can be used as the secondary coolant and cooling unit. The frame design allows use of rigid covers (glass or plastic) 269 to be used in lieu of top cover 204 or absorbers such as flat plate metal or roll bond aluminum can be used in lieu of absorber 206.

I claim:

1. A solar collector panel comprising:
 a. a frame;
 b. a top transparent to solar radiation sealingly mounted to said frame, said top being lenticulated and inflatable and comprised of molded thermoplastic film;
 c. an absorber cell mounted to said frame and spaced below said top;
 d. a reflective member mounted in said frame and spaced below said absorber cell;
 e. an insulation member mounted in said frame and spaced below said reflective member;
 f. a bottom cover sealingly mounted to cover the bottom of said frame; and g. mounting means for mounting said top, said absorber cell and said bottom cover at the respective peripheral edges thereof comprising corresponding lock-in means for engaging the respective peripheral edges and corresponding grooves in said frame for securely retaining said corresponding lock-in means.

2. A rigid frame of thermal insulating material for surrounding and securing solar collector panel elements in mutually spaced, parallel relation, said frame comprising, fluid inlet and outlet means connected to said frame and communicating with fluid-containing solar collector panel elements, a first surface having a plurality of vertically disposed, mutually spaced horizontal, continuous grooves adapted to receive splined strips and a first elongated, horizontal, continuous recess having a shoulder portion adjacent the vertically disposed, mutually spaced grooves, and, a second surface having a second horizontal, continuous groove adapted to receive a splined strip and a second elongated, horizontal, continuous recess having first and second shoulder portions adapted to receive locking means in engagement therewith, whereby said grooves in said frame, said elongated recesses and said locking means cooperate to secure said frame and said collector panel elements.

* * * * *